Jan. 7, 1941. W. F. HEROLD 2,227,832
CASTER BRAKE
Filed Nov. 9, 1939
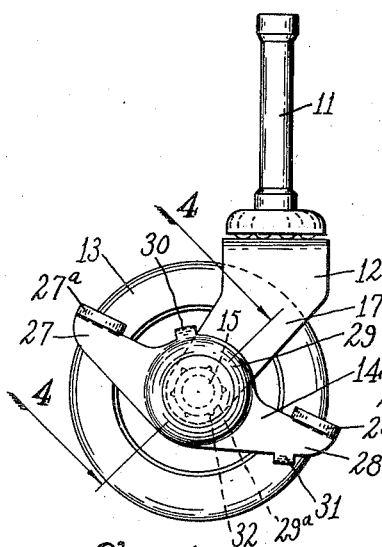
Fig. 1.
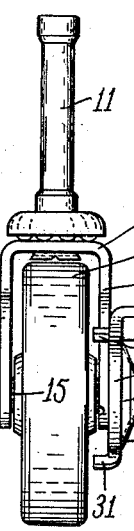
Fig. 2.
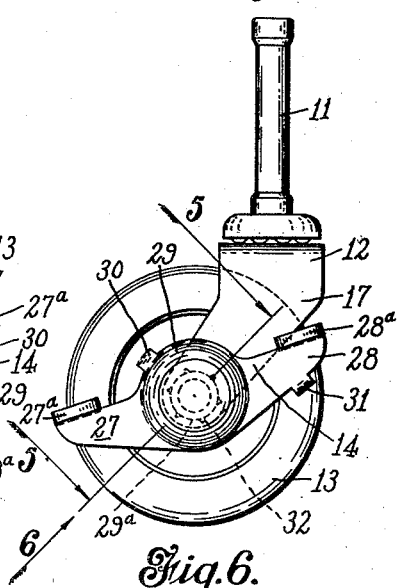
Fig. 3.
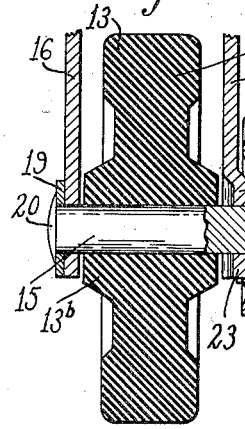
Fig. 4.
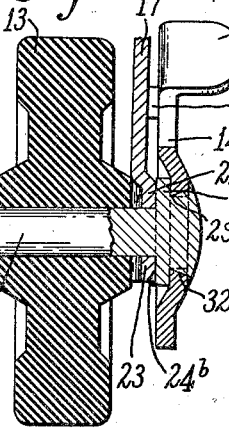
Fig. 5.
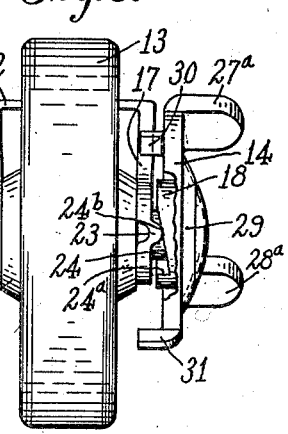
Fig. 6.
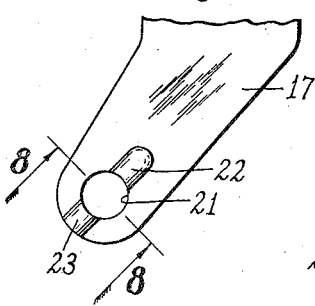
Fig. 7.
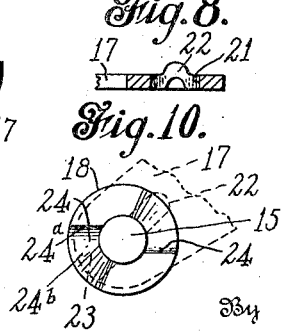
Fig. 8.
Fig. 10.
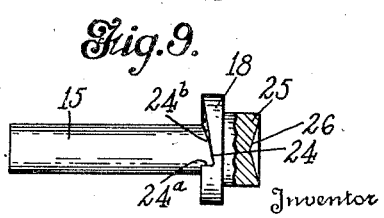
Fig. 9.
Inventor
Walter F. Herold
By Rockwell & Bartholow
Attorneys Patented Jan. 7, 1941

2,227,832

UNITED STATES PATENT OFFICE 2,227,832

CASTER BRAKE

Walter F. Herold, Bridgeport, Conn., assignor to The Bassick Company, Bridgeport, Conn., a corporation of Connecticut Application November 9, 1939, Serial No. 303,525

9 Claims. (Cl. 188—72)

This invention relates to brakes for casters such as used on tea wagons and the like where it is desirable to provide the caster with means adjustable at will for preventing the rotation of the wheel so that the tea wagon or the like will be held on the floor in a fixed location.

In previous braked casters, cams have been employed for creating a pinching or locking effect upon the caster wheel, but so far as I am advised the cams of previous devices were of such a nature as to preclude proper action of the brake, and there was also such an amount of looseness or play in the assembly that in manufacturing the article it was very difficult to produce a number of casters having the same braking action.

One of the objects of my invention is to overcome these defects by providing a braked caster involving cam surfaces for producing a braking action, which caster can be very accurately made and accurately set up in the process of assembly.

Another object is to facilitate the assembly of the articles and to increase the uniform excellence of the product.

Still another object is to provide a compact and strong braked caster of attractive appearance.

To these and other ends the invention consists in the novel features and combinations of parts to be hereinafter described and claimed.

In the accompanying drawing:

Fig. 1 is a side elevation of a caster embodying my improvements, with the brake lever in the "off" position;

Fig. 2 is an edge view of the parts shown in Fig. 1;

Fig. 3 is a side elevation showing a braked position;

Fig. 4 is an enlarged section on line 4—4 of Fig. 1;

Fig. 5 is an enlarged section on line 5—5 of Fig. 3;

Fig. 6 is a view looking in the direction of the arrow marked "6" in Fig. 3;

Figs. 7 and 8 are details of the lower end of one of the horn legs, Fig. 8 being a section on line 8—8 of Fig. 7; and Figs. 9 and 10 are, respectively, a side elevation and an end view of the rivet axle.

In the drawing I have shown my improvements applied to a tea wagon caster having a spindle 11, a horn 12, and a wheel 13, said wheel preferably being composed of a suitable rubber compound molded to the required shape. The form of the wheel may be varied, but I prefer it to have a profile similar to that shown in Figs. 4 and 5 involving a rim 13ª and a hub 13ᵇ presenting end portions which project somewhat from the side faces of the wheel. The braking device involves a lever member 14 mounted in the manner hereinafter described upon the rivet axle 15, by means of which the wheel is journaled between the leg portions 16 and 17 of the horn. The wheel is free to turn on the axle. Associated with the rivet axle 15 in a location behind the body of lever 14 is a rotary cam device 18 adapted to act in such a manner as to brake the wheel, and in the preferred form the braking effect upon the wheel is produced by creating a pinching or squeezing effect of the horn legs upon the enlarged hub portion 13ᵇ of the wheel.

Referring now to the details of the structure, it will be seen that the rivet axle 15 is of the form shown in Figs. 9 and 10, and that at the left-hand side of Fig. 4 the rivet axle has a plain end passing through a hole in the leg 16 and through a washer 19 at the outer side of said leg, the extremity of the axle being upset to provide a rounded rivet head 20. At the lower extremity of the other horn leg 17 there is provided a hole 21 receiving the shank of the rivet axle. At opposite sides of the hole 21, as shown in Fig. 7, portions of leg 17 are struck up to provide integral ribs 22 and 23 which are in alinement with each other in a direction lengthwise of the horn leg. These ribs are at the outer face of leg 17 and are adapted to be acted upon by the cam device 18 in producing a braking effect upon the wheel. The cam device 18 is in the form of a relatively narrow collar or flange formed integrally with the rivet axle and lying immediately adjacent the ribs 22, 23 at the outer face of horn leg 17. At its inner face the collar 18 is cut away in two places, as shown at 24, in order to provide clearance spaces in which the ribs 22 and 23, respectively, may be disposed in a certain position of the parts (Fig. 4). The cut-out portions 24 of the collar are at substantially diametrically opposite points (Fig. 10), and it will be observed that each cut-out portion is defined at one side by an abrupt shoulder 24ª from the bottom of which an inclined surface 24ᵇ extends on a gradual slope to the inner face of the collar, such surface 24ᵇ being adapted to act in the manner hereinafter described.

At the outer face of the cam collar 18 the rivet axle is extended for a short distance on a diameter slightly larger than that of the axle shank, as shown at 25, to provide a rivet head or stud by means of which the brake lever 14 may be fastened to the axle. Before assemblage of the device, the stud 25 is in the form shown in Fig. 9, the body of the same being cylindrical, and the outer face at the end of the axle being somewhat dished, as shown at 26.

The horn 12, as will be understood, is preferably made of sheet metal, and the brake lever 14, previously mentioned is also preferably made of sheet metal. The brake lever is preferably provided with oppositely extending arms 27 and 28, and an enlarged middle portion 29, said middle portion being riveted to the axle. For convenience of operation the arms 27 and 28 are provided with the laterally extending terminal lugs 27ª and 28ª. At the upper part of the brake lever adjacent its middle portion, an integral inturned stop 30 is adapted to cooperate with the adjacent edge of the horn leg 17, and at the lower part of arm 28 a similar integral stop 31 may be provided, if desired, to cooperate with the rear lower edge (Fig. 3) of the horn leg.

The middle part 29 of the brake lever is provided with a round opening 29ª having a number of equidistantly spaced angular cuts or notches 32, as shown in Fig. 5, and as indicated by the dotted lines in Figs. 1 and 3.

In the assemblage of the caster, one of the preliminary steps is the mounting of the lever 14 upon the rivet axle. The stud or rivet head 25 of the axle is extended through the hole 29ª in the lever, and the stud 25 is then upset so as to force some of its metal into the notches 32, and so as to curve over the outer face of the rivet end in the manner shown in Figs. 4 and 5, so that the rivet head conforms to the rounded or dished shape of the middle portion of the lever. It will be understood that in the operation of assemblage the middle portion of the lever will be tightly clinched against the outer face of the cam collar 18, and it will be seen that by dishing the middle part of the lever, a part of it is caused to lie substantially in the plane of the cam collar, as shown particularly in Fig. 5.

The next step in the assemblage is to pass the axle through the horn legs with the wheel in position, and this is followed by the placing of the washer 19 in position and the upsetting of the plain end of the axle to form the rivet head 20. In the position shown in Fig. 1 the ribs 22, 23 are located fully within the notches of collar 18, and the caster wheel is free to roll because the horn legs in this position clear the ends of the wheel hub, as shown in Fig. 4. However, upon moving the lever or arm structure to the position shown in Fig. 3 (for example, by pushing down with the foot on lug 27ª), the caster wheel will be effectively braked. As the lever is turned to this position, the cam surfaces 24ᵇ, acting against the rounded surfaces of the beads or projections 22 and 23, force the horn leg 17 in a direction axially of the wheel, and thereby cause the hub of the wheel to be effectively gripped between the lower ends of the horn, so that the wheel cannot rotate. There is effective grip upon the wheel over a substantial area by reason of the engagement of the flat inner faces of the lower extremities of the horn legs with the flat ends of the wheel hub.

When the brake lever is in the position shown in Fig. 3, the locking action will be very effective, but the lever can be moved still farther in a counter-clockwise direction, if desired, so as to bring up the stop 31 against the rear edge of leg 17. In order to release the braking action, the lug 28ª is engaged by the toe, and if this lug is fully depressed, the stop 30 will be brought into engagement with the forward or upper edge of leg 17.

It will be understood that in the operation of braking the caster, the axle will turn in the holes of the horn legs as a result of the tipping of the lever, which is locked to and non-rotatably engaged with the axle by being staked thereto, and that when the axle turns, the cam collar 18 turns as a necessary incident, so as to bring about the pinching action of the horn. The cam collar acts to an extent as a stop for limiting the turning movement of the axle, as will be manifest, preventing the turning of the axle to the extent permitted by the stops 30 and 31, respectively, except when a very strong turning force is exerted. In any event the axle, while free to turn, is permitted a relatively slight angular movement between the extreme positions shown in Figs. 1 and 3, respectively.

The axle is preferably constructed of a suitable length of wire or rod, upon which the cam collar and the rivet stud or head are formed by heading operations. It is a distinct advantage of my invention that the cam surfaces on the axle can be formed very accurately, and the assemblage set up very accurately without any looseness or play which would interfere with the brake becoming effective at the proper point in the turning of the brake lever. The method of assembly lends itself to speed and accuracy. The construction is considerably simplified by having the cam member an integral part of the axle. The rotation of the lever necessarily turns the axle, and the turning of the axle necessarily turns the cam and causes the horn legs to grip the wheel. The same collar which aids in positioning and securing the brake lever or arm on the axle serves as a camming device. The brake can readily be placed definitely in an "on" position in which its action is very effective, and from which it will not be shaken loose by any ordinary vibration or the like. If, on the other hand, the brake lever should be inadvertently set in a position in which the brake is only partly on, the action of the caster wheel as the tea wagon or other furniture is moved will be such as to take the brake all the way off.

While I have shown and described one form which the invention may take, it will be understood that it is susceptible of embodiment in many different forms, and that various changes in the organization of parts and in the details of construction can be made without departing from the principles of the invention or the scope of the annexed claims.

What I claim is:

1. In a caster, the combination of a wheel, a horn having legs, an axle for the wheel mounted to turn in the legs, means for turning the axle, and means including a member rigid with and turning with the axle for braking the wheel as the axle is turned.

2. In a caster, the combination of a wheel, a horn having legs for mounting the wheel, one of said legs being movable axially of the wheel to brake the wheel, an axle for the wheel mounted to turn in the horn legs, manipulable means for turning the axle, and means including a cam rigid with the axle and moving angularly with the axle for shifting the movable leg to brake the wheel.

3. In a caster, the combination of a wheel having a hub extended laterally past both wheel faces, a horn having relatively movable legs adapted to grip the wheel hub ends for braking the wheel and to clear the wheel hub ends to permit rotation of the wheel, means including an axle having a rigidly affixed cam collar mounted to turn in the legs and journaling the wheel and controlling by its angular position the braking and releasing of the wheel, and manipulable means for turning the axle.

4. In a caster, the combination of a wheel, a horn having yieldable and relatively movable legs adapted to grip and release the wheel, an axle for the wheel mounted to turn in openings in the ends of the legs, an axle-turning lever or arm fixedly carried by said axle at one end of the latter, and a cam carried by said axle between said lever and one of the horn legs and acting on said last-named horn leg when said axle is turned to shift said horn leg axially of the wheel.

5. In a caster, the combination of a wheel having a hub projecting at both ends beyond the side faces of the wheel, a horn having resilient legs adapted to grip and release the end faces of said hub, an axle passing through said hub and on which said wheel is free to turn, said axle being mounted to turn in openings of the horn legs, a cam collar integral with the axle and in a location immediately adjacent the end of one of said legs at the outer face thereof, said leg having an integral raised portion adapted to be engaged and acted upon by said cam collar for braking the wheel, and an arm carried by said axle at one end thereof and by means of which said axle can be turned.

6. In a caster, the combination of a wheel, a horn, a wheel axle mounted to turn in the horn, an arm at one end of the axle by means of which the same can be turned, a collar on said axle presenting an outstanding shoulder against which said arm is secured at the outer side of the collar, and braking means for the caster including a cam surface formed on said collar at the inner side.

7. In a caster, the combination of a wheel, supporting legs therefor, one of which is movable toward and from the wheel to grip and release the same, an axle for the wheel mounted to turn in the legs, a collar projecting laterally from the axle adjacent one end thereof, an operating arm applied to said axle outside of said collar and riveted against the collar by the upset end of the axle, a cam surface on the collar at the inner face thereof, and a cam projection on said movable leg cooperating with said cam surface.

8. In a caster, the combination of a wheel, a horn having legs, a wheel axle mounted to turn in the legs, braking means including a collar integral with the axle having a cam face opposing the outer surface of one of the legs, and an operating arm rigidly fastened to the axle against the outer side of the collar.

9. In a caster, the combination of a wheel having a hub projecting at both ends beyond the side faces of the wheel, a horn having resilient legs adapted to grip and release the end faces of said hub, an axle passing through said hub and on which said wheel is free to turn, said axle being mounted to turn in openings of the horn legs, a cam collar integral with the axle and in a location immediately adjacent the end of one of said legs at the outer face thereof, said leg having an integral raised portion adapted to be engaged and acted upon by said cam collar for braking the wheel, and an operating lever having an open middle portion whereby it is rigidly fixed to said axle against the outer side of said cam collar, said lever having stop means co-acting with said last-mentioned leg for limiting the turning movement of said axle.

WALTER F. HEROLD.